(12) United States Patent
Basak et al.

(10) Patent No.: US 8,903,995 B1
(45) Date of Patent: Dec. 2, 2014

(54) PERFORMANCE IMPACT ANALYSIS OF NETWORK CHANGE

(75) Inventors: Jayanta Basak, Bangalore (IN); Vipul Mathur, Bangalore (IN); Siddhartha Nandi, Bangalore (IN); Srinivasan Narayanamurthy, Bangalore (IN); Kaladhar Voruganti, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 196 days.

(21) Appl. No.: 13/553,741

(22) Filed: Jul. 19, 2012

(51) Int. Cl.
*G06F 15/16* (2006.01)

(52) U.S. Cl.
USPC .......................................... 709/224

(58) Field of Classification Search
CPC ............................ H04L 41/142; H04L 41/147
USPC ...................................................... 709/224
See application file for complete search history.

(56) References Cited

U.S. PATENT DOCUMENTS

| 8,346,917 B2 * | 1/2013 | Balasubramanian et al. | 709/224 |
| 2004/0019469 A1 * | 1/2004 | Leary et al. | 703/2 |
| 2013/0262656 A1 * | 10/2013 | Cao et al. | 709/224 |

* cited by examiner

*Primary Examiner* — Kevin Bates
*Assistant Examiner* — Nazia Naoreen
(74) *Attorney, Agent, or Firm* — DeLizio Gilliam, PLLC

(57) ABSTRACT

A network server analyzes a change in the network, including performing a machine-learning analysis of an extrapolation space. The server accesses observed data from multiple counters that each record samples for a metric in the network. The server performs a CART (classification and regression tree) analysis of the observed data to select the counters whose metrics affect a target network performance, such as latency. The server estimates an extrapolation space based on the observed data for the selected counters. The server then performs a machine-learning analysis of the extrapolation space based on a kriging model of the selected counters.

24 Claims, 10 Drawing Sheets

Extrapolation 510

Input: $S$ : Signature with k samples, and $C_i$, $0 \leq i \leq m$: counters in signature set $S$.
$C_{ij}$ denote value of counter $i$ at sample $j$
Output: Latency values for next $\Delta X/\delta X$ Samples.
1: Next Sample index $z = k + 1$
2: Initialize next sample $C_{iz} = 0$, $\forall C_i \in S$
3: for $iops = X + \delta X$; $iops \leq X + \Delta X$; $iops = iops + \delta X$ do
4:     $iops_z = iops$
5:     for Every $C_i \in S$ do
6:         $Test = [iops_z, C_{j(z-1)} [\forall C_j \in S, \text{and } j \neq i], Latency]$
7:         $Train = \text{getTrainingData}(C_i, Test)$
8:         $C_{iz} = \text{modifiedKriging}(Test, Train)$
9:     end for
10:    $Test = [iops_z, C_{jz} [\forall C_j \in S, \text{and } j \neq i]]$
11:    $Train = \text{getTrainingData}(Latency, Test)$
12:    $[latency_z, confidence] = \text{modifiedKrigingConfidence}(Test, Train)$
13:    Increment sample index $z = z + 1$
14: end for getTrainingData 520

1: $Tree = \text{Load}(Counter.T)$
2: $Nodes = \text{findNode}(Tree, vector)$
3: $\text{Return}(\text{All samples corresponding to } Nodes)$

PERFORMANCE IMPACT ANALYSIS OF NETWORK CHANGE

FIELD

Embodiments described are related generally to network analysis, and embodiments described are more particularly related to analyzing a performance impact associated with a network change.

COPYRIGHT NOTICE/PERMISSION

Portions of the disclosure of this patent document can contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2012, NetApp, Inc., All Rights Reserved.

BACKGROUND

Changes in an operating parameter of a network system can impact network performance with respect to another operating parameter of the network system. Systems designs attempt to provide tools to allow the systems to predict system behavior when the system detects a network change. Current prediction tools are based on predictive system models, which are models of system variables and relationships among various variables.

Predictive models can traditionally be classified as white-box or black-box models. White-box modeling models changes based on known data and known system configurations. Thus, white-box modeling predicts behavior for known circumstances. Black-box modeling allows for interpolation, which is prediction not based on prior observation, but instead based on training data. The training data is data that estimates what might happen if a variable in system operation changes. Both types of modeling predict system behavior when a change is introduced into the system. Both types of modeling can be used to proactively assess system behavior prior to making the change that is assessed by the modeling.

Increasingly, white-box modeling is becoming more difficult and time consuming due to highly complex system configurations and the complex interplay between the various hardware and software components in network systems. An example of a network system that is increasing in complexity is a network storage system, which can experience significant interaction between hardware and software components under different workload conditions.

Similarly, black-box modeling is becoming increasingly difficult and time consuming. Black-box models are only good for known configurations and system configuration/operation combinations for which they have been trained. Performing accurate a priori training for black-box models is impractical for the combinatorially expansive number of hardware and software combinations of current network systems.

Additionally, the dynamic runtime nature of system configurations and system operating conditions negatively impacts the ability to model the system. Even if the possible combinations of system configurations can be foreseen, there may not be a practical way to model all the combinations in a real system with limited computational resources. The combinations of system configurations can lead to configurations that are impractical to accurately model with any degree of confidence, which makes it impractical to train the system for black-box modeling.

SUMMARY

A network server analyzes a change in the network, including performing a machine-learning analysis of an extrapolation space. The server accesses observed data from multiple counters that each record samples for a metric in the network. The server performs a CART (classification and regression tree) analysis of the observed data to select the counters whose metrics affect a target network performance. The server estimates an extrapolation space based on the observed data for the selected counters. The server then performs a machine-learning analysis of the extrapolation space based on a kriging model of the selected counters.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

FIG. 5 is an embodiment of pseudo-code for performing kriging-based extrapolation.

Figure 1A:
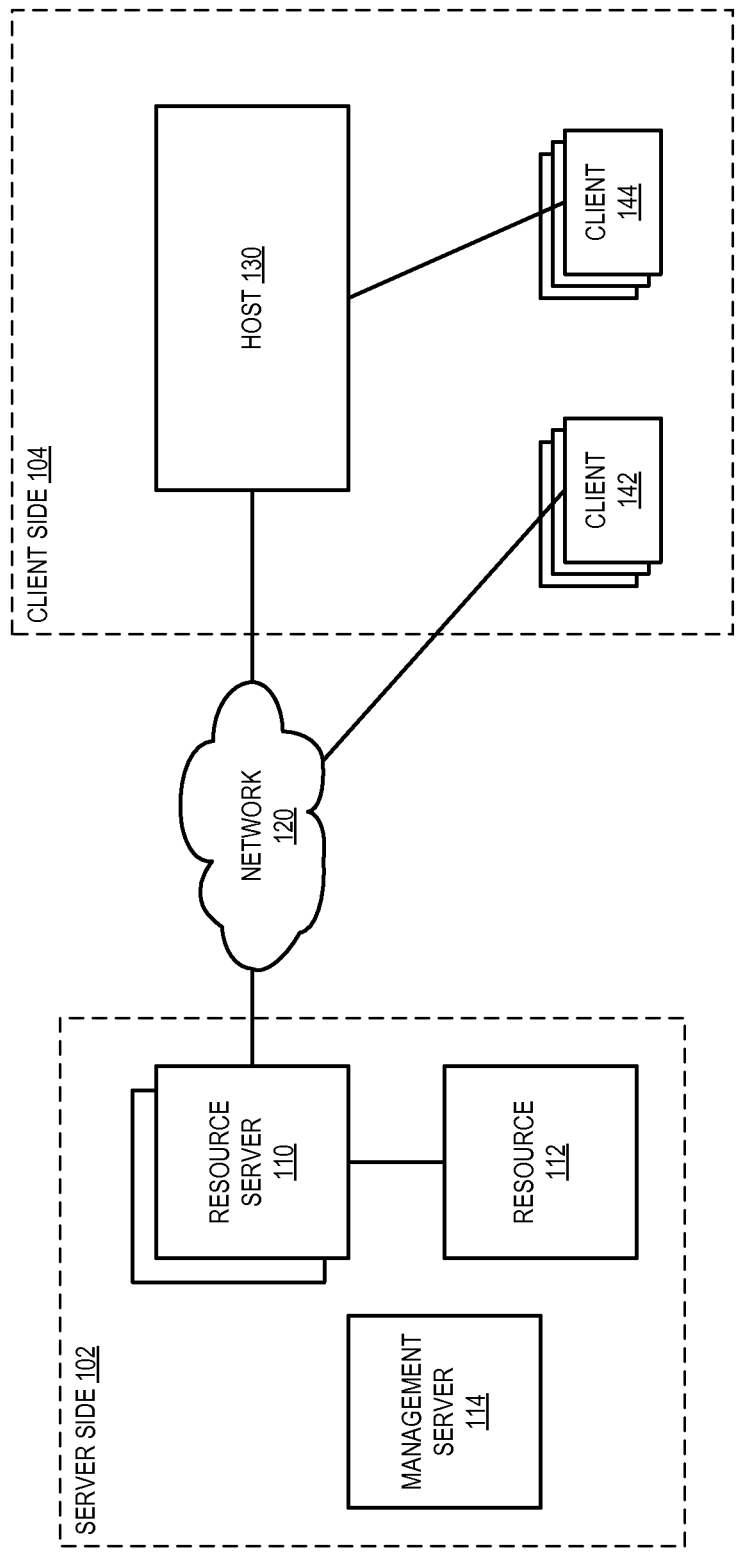
FIG. 1A is a block diagram of an embodiment of a system that evaluates a change to a network to determine an expected impact of the change.

Descriptions of certain details and embodiments follow, including a description of the figures, which can depict some or all of the embodiments described below, as well as discussing other potential embodiments or implementations of the inventive concepts presented herein.

DETAILED DESCRIPTION

As described herein, a network server performs extrapolation based on a kriging model of a network system. Thus, the network server can predict system behavior for unobserved regions of system operation in a dynamic environment. The network server analyzes an impact of an expected change in the network. The server accesses observed data from multiple counters that each record samples for a metric in the network, the metrics together defining the system behavior. The server predicts system behavior for unobserved regions of system operation by using a combination of analysis techniques.

The server first performs a CART (classification and regression tree) analysis of the observed data to select the counters whose metrics affect a target network performance. Such an operation could be referred to as pruning the system counters down to only those that affect the desired target performance. Then the server performs a machine-learning analysis with a kriging-based analysis on the relevant nodes as selected or identified by the CART analysis. The overall analysis with the combination of analysis techniques is a black-box modeling approach.

In one embodiment, the analysis is applied to a storage system, where the analysis approach can be referred to as M-LISP (Machine-Learning based Incremental Storage Provisioning). In storage systems, the question to be answered is how response time of the system will change for a workload if more load of the same workload type is added to the system. The question is traditionally a hard problem given the requirement to address an unobserved region of system operation, and given the fact that system behavior will not necessarily be linear in the unobserved region.

With the combination of analysis techniques as described herein, the system can build a model of the system that allows it to proactively predict the impact of adding a workload to the system. The system observes the behavior of the storage system (by storing data with multiple counters) for past usage and builds a machine-learning based black-box model using the counters. For any extra workload, the system extrapolates the model behavior and predicts the performance. In one embodiment, the prediction is generated incrementally by making iterative predictions into the extrapolation space for sub-portions of the desired change until achieving a prediction of the entire desired change.

The use of the CART analysis allows the system to prune data to the data of interest, such as latency versus IOPS (input/output transactions per second) for a storage system, while also enabling runtime modeling and prediction. The CART analysis provides the system model with the ability to respond to non-linear behavior in the unobserved region. The kriging-based analysis provides the system model with confidence bands for the ultimate predictions.

FIG. 1A is a block diagram of an embodiment of a system that evaluates a change to a network to determine an expected impact of the change. System 100 is a server system that includes a management server to evaluate changes to a load in the system. It will be understood that system 100 can be any type of system with a server with limited hardware resources that can have a dynamic load on the server. Examples of such systems can include, but are not limited to, storage server systems, web service hosts, data servers, database systems, online gaming or parallel access systems, or other systems. In general, the system can be perceived as having server side 102 where the server resides, and client side 104, with the server side and client side connected via network 120.

Clients 142, 144 access resource 112 over network 120 from one or more resource servers 110. Resource 112 corresponds to the type of system (e.g., resource 112 can be a database in a database system, or storage in a storage server system). The load on a given resource server is generated by requests from clients 142, 144. The requests can be in the form of data access requests, service requests, I/O (input/output) requests (which are requests to read and/or write data), or other client access. Some clients such as clients 142 directly access resource server 110 over network 120. Other clients such as client 144 can access resource server 110 via host device 130, which in turn access the server via network 120. Host device 130 can be a proxy or a distributed node.

In one embodiment, access requests are made and serviced in system 100 as workloads or loads (not specifically shown). Workloads are separate or distinct streams of requests from different sources, or streams of requests that originate from different applications or different clients. Thus, each workload associated with requests from a different application can be referred to as a distinct workload. The different workloads can access either the same or different resource 112. System 100 can monitor the loading on resource server 110 with management server 114.

In one embodiment, management server 114 is part of resource server 110. In an alternate embodiment, management server 114 is separate from resource server 110. Management server 114 implements analysis of expected changes to a load of resource server 110. Management server 114 can evaluate the expected effect on system loading for any system change. Management server 114 represents the components involved in performing a CART analysis in combination with a kriging-based analysis. In one embodiment, the kriging-based analysis is a modified kriging analysis, modified as described in more detail below.

Figure 1B:
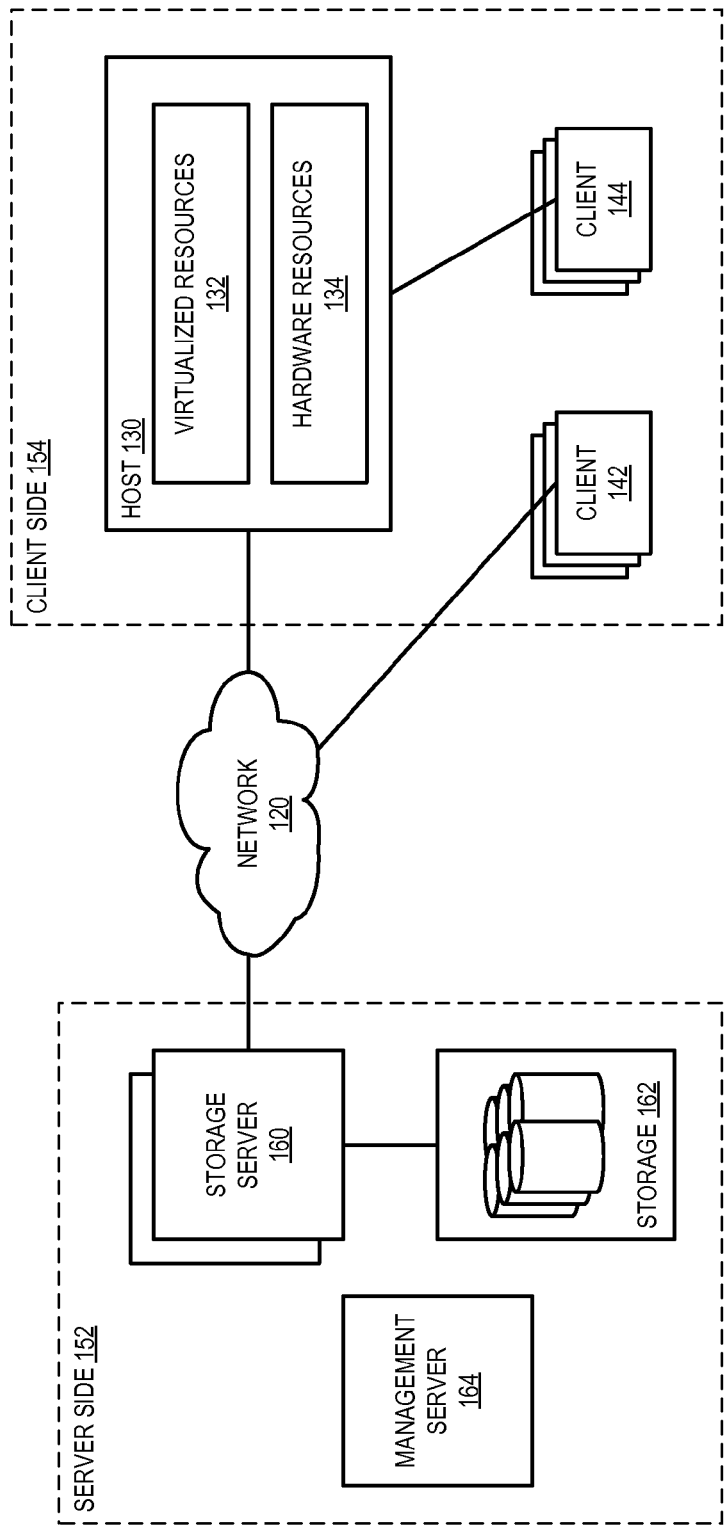
FIG. 1B is a block diagram of an embodiment of a storage system that evaluates a change to determine an expected impact of the change.

FIG. 1B is a block diagram of an embodiment of a storage system that evaluates a change to determine an expected impact of the change. System 150 is one simplified example of a networked storage system in which the change evaluation can be used, and is one example of a server system in accordance with system 100 of FIG. 1A. It will be understood that examples of storage systems is only one possible implementation where change evaluation as described herein can be employed.

System 150 includes server side 152, and client side 154. Server side 152 includes one or more storage servers 160, which serve data to clients 142, 144 over network 120. Storage server 160 manages storage 162, including I/O (input/output) transactions to and from the storage resources. In one embodiment, access requests to storage server 160 are managed as separate workloads, and have associated SLOs (service level objectives, which can also be referred to as service level agreements or SLAs). The SLO for a workload indicates a quality of service at which storage server 160 should service the workload.

As mentioned previously, clients 142, 144 are the sources of the workloads. It is common for the workloads to be dynamic, both in terms of how many resources are requested by each individual workload over time, as well as in the number of active workloads at any given point in time. System 150 includes various metric monitoring components (not shown, see FIG. 2 below) to monitor various system metrics, such as latency, bandwidth, I/O transactions, and other metrics. The metrics change over time with the dynamic nature of system 150. Management server 164 can use the monitored data to predict how an increase in a workload or workload type would affect system 150. More particularly, in one embodiment, management server 164 predicts whether the increase in workload in system 150 would prevent storage server 160 from fulfilling the SLOs for the active workloads in system 150.

In one embodiment, host 130 of client side 154 includes hardware resources 134, which represent one or more hardware resources on which a client can execute. In one embodiment, hardware resources 134 are shared resources in a virtualized environment. VMs (virtual machines) can be clients or host environments for clients. Virtualized resources 132 represent the VMs or other virtualization components implemented on hardware resources 134. It will be understood that virtualized resources include one or more logical instances of mappings or allocations of hardware resources to create a logical environment in which programs can be executed. As used herein, instantiation refers to creating an instance or a copy of a source object or source code. The source code can be a class, model, or template, and the instance is a copy that includes at least some overlap of a set of attributes, which can have different configuration or settings than the source. Additionally, modification of an instance can occur independent of modification of the source.

Management server 164 predicts expected system behavior through the use of a CART analysis followed by a kriging-based analysis. The combination of the CART analysis and the kriging-based analysis enables management server 164 to extrapolate into unobserved behavior, and predict how increased loading in system 150 will affect the system behavior managed by storage server 160. Contrast such an approach to traditional white-box modeling, which is increasingly ineffective due to the dynamism of the system behavior and the innovations in the storage system stack. Additionally, contrast such an approach to traditional black-box modeling, which is increasingly ineffective due to the difficulty to a priori train the model for dynamic and multitenant data center environments.

Figure 2:
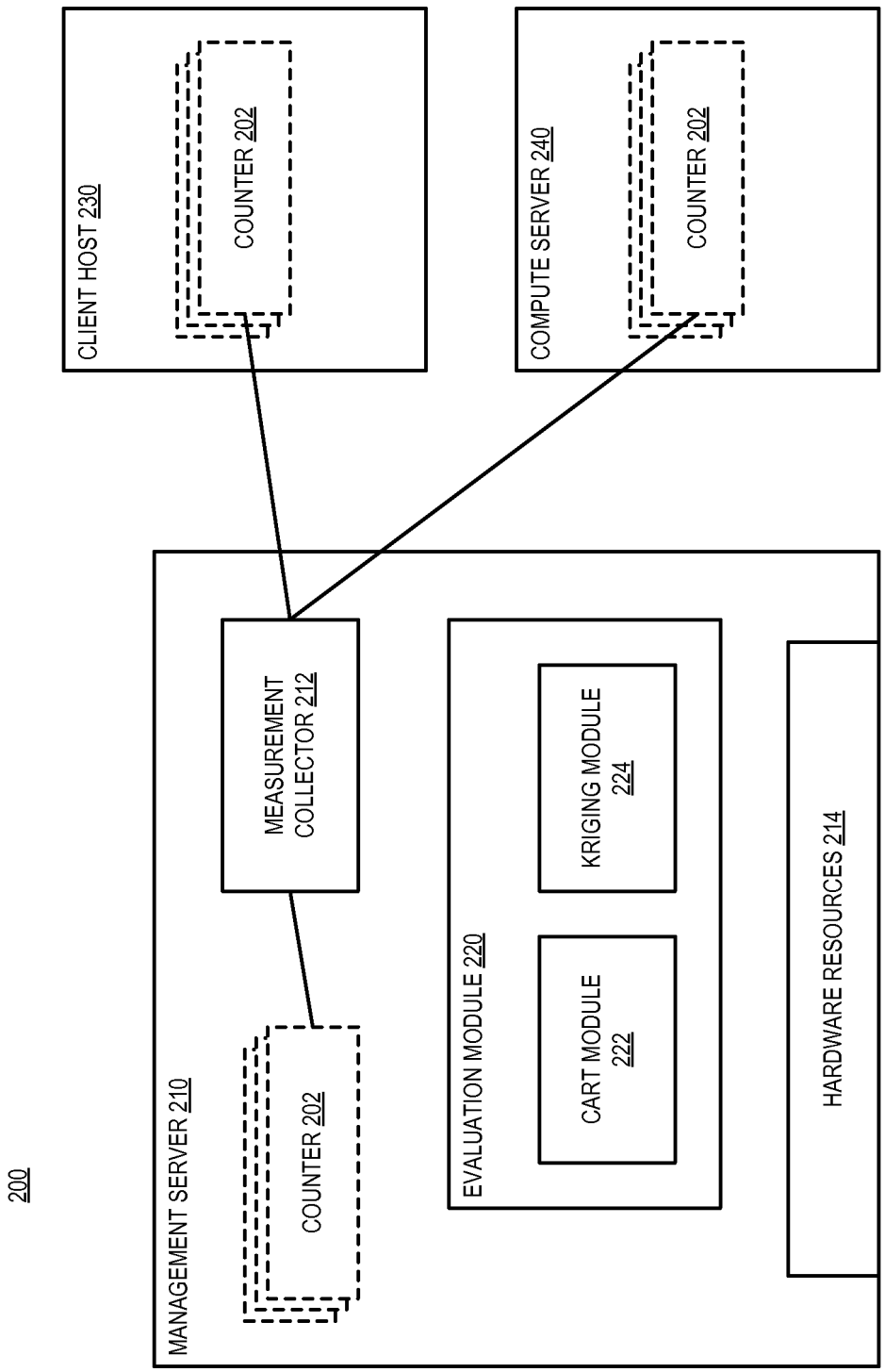
FIG. 2 is a block diagram of an embodiment of a management server with an evaluation module to evaluate a change in a network based on data observed by multiple counters.

FIG. 2 is a block diagram of an embodiment of a management server with an evaluation module to evaluate a change in a network based on data observed by multiple counters. System 200 is one example of a system according to system 100 of FIG. 1A, illustrating more details regarding counters or metric monitoring components of the system. System 200 includes management server 210, which includes measurement collector 212 and evaluation module 220. In one embodiment, system 200 includes client host 230. In one embodiment, system 200 includes compute server 240.

Management server 210 represents one embodiment of a management server according to any embodiment described herein. Counters 202 can be located in one or more locations throughout system 200. For example, management server 210 or a resource server or a storage server can include one or more counters 202. In one embodiment, one or more counters are located at client host 230. In one embodiment, one or more counters are located at computer server 240. Compute server 240 represents a server other than a resource server of system 200, which provides computation services to the resource server, or otherwise offloads a load of the resource server.

Counters 202 can include any monitoring or storing or logging of behavior information for system 200. The information can be stored as specific samples of conditions in the system at a given point in time. Behavior information refers to any operating condition or environment configuration for the system. Each such condition can also be referred to as a system metric. System metrics can include system specific metrics and/or workload specific metrics. System specific metrics can refer to overall bandwidth utilization, system-wide read-to-write ratio, CPU (central processing unit) utilization, or any other metric or hardware or software state measurement.

Workload specific metrics can refer to metrics that are specific to a given workload. It will be understood that such metrics are typically already collected in many systems, to evaluate service level objectives (SLOs) for the workloads. Workload specific metrics can include any metric that can be recorded for individual workloads and include, but are not limited to IOPS (input/output per second), data throughput, latency, random/sequential read ratio, or I/O (input/output) size. Management server 210 includes measurement collector 212 to access counters 202 to collect the metrics monitored by the counters.

Measurement collector 212 executes through network access hardware that is part of hardware resources 214 of management server 210 to interface with counters 202. The network access hardware can include any form of network connection including network interface circuits over which measurement collector can access counters 202 and receive data from them. In one embodiment, measurement collector 212 includes driver software, or access to driver software to enable the access to counters 202.

In one embodiment, aspects of management server 210 are implemented as part of a management layer of the resource server. Thus, management server 210 can be implemented as part of a MADE (monitoring, analysis, planning, and execution) loop of a management routine of a resource server. Management server 210 provides the ability to evaluate resource utilization changes in system 200 to allow the system to aggressively increase resource utilization while not violating any performance, protection, or availability SLOs. Management server 210 accomplishes the evaluation by providing predictions that answer the following two questions: 1) whether the SLO requirements of an application or workload being provisioned can be satisfied by the underlying resource server; and, 2) whether deploying the new workload will negatively impact the SLOs of the already deployed applications or workloads.

Evaluation module 220 executes on processing resources that are part of hardware resources 214 of management server 210. Processing resources can include CPUs (central processing units), or discrete processors, memory or other caching hardware, registers, logic units (e.g., ALUs (arithmetic logic units), multipliers), or other logic. Evaluation module 220 can be executed at least partially in software and used to configure a hardware device to perform the functions described, and/or can be executed at least partially in hardware devices specifically programmed to execute the functions described.

Evaluation module 220 generates a model of the behavior of system 200 to make the predictions. Measurement collector 212 measures system counters 202 to gather the data recorded or observed for the behavior of system 200. All data contributes to the observed region of system behavior. The observed behavior as collected by all counters 202 includes data that is relevant to a number of different possible target performance indicators. Management server 210 can make predictions about any target performance informed by the system counters. In one embodiment, latency versus IOPS is a target performance indicator of interest in storage systems. Other target performance indicators will be of interest for various different systems and network configurations.

CART module 222 of evaluation module 220 filters the data from counters 202 to focus only on data relevant to the target performance indicator. Kriging module 224 extrapolates system behavior based on the relevant data provided by CART module 222. In one embodiment, a complete set of measurement data is collected by management server 210 periodically and stored as raw measurements by measurement collector 212. In one embodiment, evaluation module 220 is configured to evaluate a specific target performance of system 200. For example, evaluation module 220 can be configured to evaluate the system for latency to allow it to predict how additional loading in system 200 will affect latency of existing loads.

Not all counters 202 will record data relevant to latency. The counters that are relevant to a specific target performance indicator, such as latency for a workload type, will not always be the same counters for various workloads or system configurations. Thus, CART module 222 determines a "signature" for the target performance indicator. The signature identifies a set (which can be considered a subset of all the counters) of counters that are interdependent, and thus affect the target performance indicator. Counters not in the set identified by the signature do not influence the counters in the signature. The data from counters 202, as filtered by CART module 222, then indicates observed behavior or observed data samples for a range of system behavior. For purposes here, call the observed range 0 to X.

Kriging module 224 extrapolates, in contrast to interpolation for which kriging analysis has traditionally been used. Based on the observed data filtered by CART module 222, kriging module 224 generates a model with which to predict system behavior for a range of X to X+$\Delta$X. In one embodiment, as described in more detail below, the kriging module makes the prediction in the unobserved region by incrementally predicting the samples. The prediction can be sample-by-sample on the same granularity as the observed samples, or it can be on a coarser granularity. Thus, in one embodiment, kriging module 224 makes predictions for each $\delta$X from X to X+$\Delta$X, where $\Delta$ is an integer multiple of $\delta$.

Figure 3:
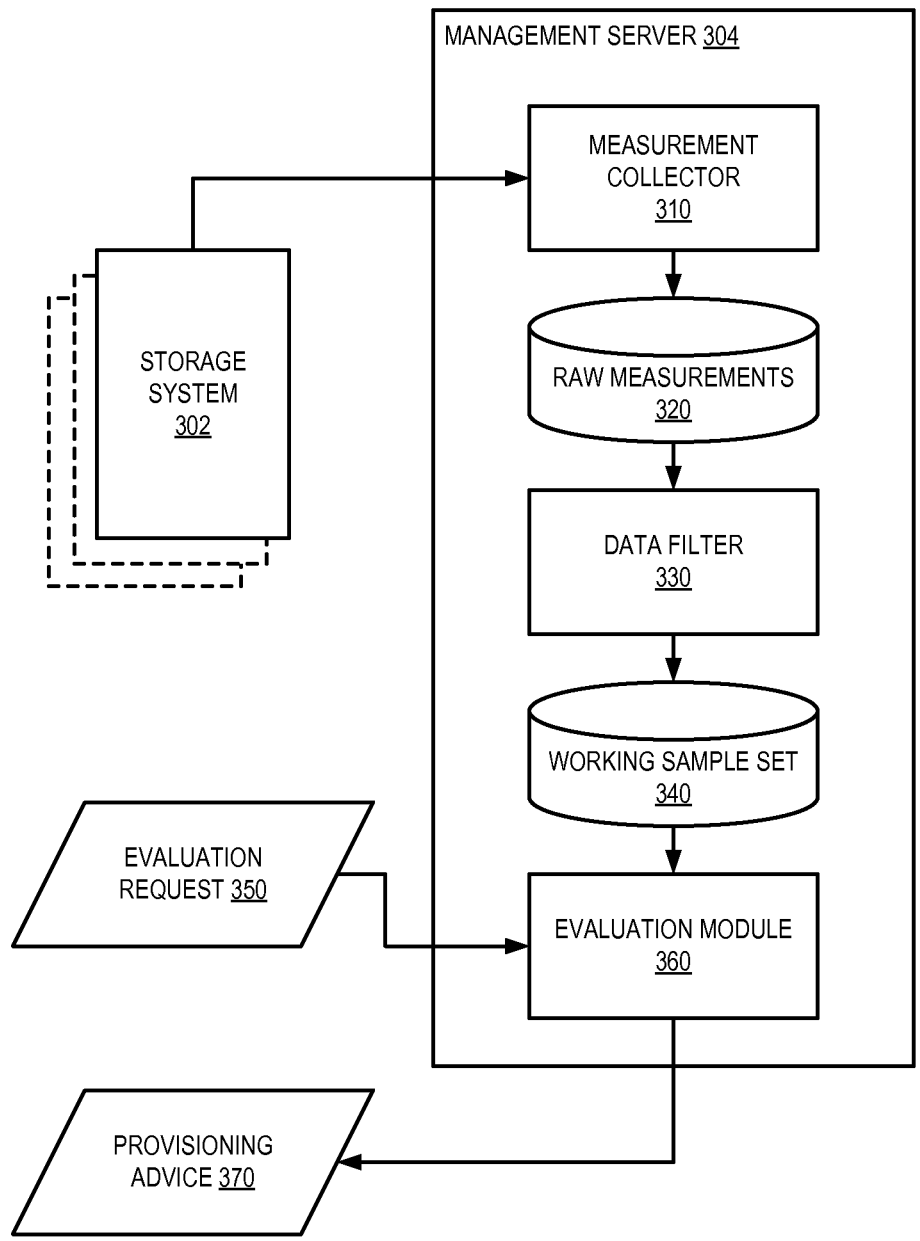
FIG. 3 is a block diagram of an embodiment of a management server that evaluates a change to a network to determine an expected impact of the change.

FIG. 3 is a block diagram of an embodiment of a management server that evaluates a change to a network to determine an expected impact of the change. System 300 is one example of a system that evaluates a change in the network system according to any embodiment described herein, such as system 100 of FIG. 1A or system 150 of FIG. 1B. Management server 304 is an embodiment of a management server in accordance with any embodiment described herein, such as management server 210 of FIG. 2. In one embodiment, system 300 includes storage system 302. It will be understood that a storage system is one example of a system in which change evaluation can be made, and shown only for purposes of illustration; other examples are possible.

Management server 304 is illustrated architecturally, with certain functions shown in a framework based on flow of operation by management server 304. Storage system 302 includes various counters that take samples or measurements of system state metrics. Measurement collector 310 accesses the counters of storage system 302 to gather the sampled data from the counters. It will be understood that the gathered data will be data that is relevant to a particular network performance of interest (or a target performance indicator) to be evaluated by management server 304. In one embodiment, storage system 302 internally monitors various metrics at regular intervals (e.g., every 30 seconds), which can be collected by measurement collector 310 periodically (e.g. every hour). Measurement collector 310 stores the collected data as raw measurements 320.

In one embodiment, management server 304 cleans up and samples data with data filter 330 to create working sample set of measurements 340. The filtered data represented by working sample set 340 forms one input to the evaluation module 360. An external source (not shown) generates evaluation request 350, which indicates a change and prompts evaluation module 360 to perform an extrapolation analysis to predict the behavior of storage system 302 in light of the requested change. In one embodiment, the external source is an application or a module that provisions storage in storage system 302 (or other resource in a different type of system).

In one embodiment, evaluation request 350 is broken up into a series of incremental requests, and evaluation module 360 iteratively evaluates each incremental request, building one analysis upon the results of the previous request. In one embodiment, evaluation module 360 separates a requested change into incremental portions and iteratively evaluates the change by basing each iteration on the previous iteration until achieving a result. Thus, evaluation module 360 uses learned system behavior (e.g., based on working sample set 340) to provide a result. The result is provided to the requester as provisioning advice 370, or other advice, depending on the system type.

Thus, it will be understood that management server 304 performs live evaluation of a change in the system, referring to the fact that management server 304 provides evaluation during the runtime of the system using data gathered during runtime of the system, when the system is operational. The modeling performed by management server 304 is thus current to the system and can therefore respond to the dynamic nature of modern networked systems and multitenant environments.

Management server 304 models the system dynamically, and is thus system and workload agnostic, in contrast to traditional modeling approaches, which require information about specific configurations. As discussed above, management server 304 determines what counters are relevant to the target performance indicator, and bases its analysis on those counters. The determining what counters are relevant could be referred to as constructing a load signature for the loading in the system that will be the subject of the analysis. Thus, part of the analysis is to determine what specific counters should be modeled to make the desired prediction. In one embodiment, a CART model includes a certain amount of variance in each leaf node for the observed samples for the target performance indicator (e.g., latency). The variance allows for modeling nonlinear behavior of the system.

In one embodiment, storage system 302 includes components, such as compute servers that operate in parallel with a storage server to perform management operations. In such an embodiment, measurement collector 310, raw measurements 320, data filter 330, and/or working sample set 350 can exist within storage system 302. Thus, management server 304, or the functions of management server 304 as shown, can be distributed in system 300. Alternatively, the primary system server (e.g., the storage server) can perform one or more of the enumerated functions. Either with the storage server or other compute servers performing operations in the storage system, the ability of the system to perform the operations depends on availability of resources in the system. In one embodiment, management server 304 performs evaluation services for multiple storage systems 302.

In one embodiment, management server 304 always uses cleansed data for predicting future behavior. Thus, data filter 330 can include cleansing functions to produce working sample set 340. Data cleansing includes functions such as checking for missing counter values, checking for constant values, and determining if any counters are inactive. Data filter 330 can eliminate counters from consideration when they are not active or counters that are constant, meaning they are measuring a metric that is not dynamic, and therefore do not need to be considered when predicting how a change will affect the system. If the number of instances of missing values of a counter is larger than a predetermined threshold, the particular counter can also be eliminated, because it does not provide enough good data to guide the prediction.

In one embodiment, management server 304 collects more data than can be used in a practical implementation, due to limits on computational capacity and/or time. Thus, in one embodiment, data filter 330 includes a sampling function to sample raw measurements 320 to reduce the number of measurements under consideration in working sample set 340. It will be understood that the reduction on the number of measurements in working sample set 340 is different than the pruning of data performed by CART analysis in evaluation module 360. The CART analysis prunes samples based on relevance to the target performance indicator. Data filter 330 can reduce the amount of data by sampling collected data.

It will be understood that the larger working sample set 340 is, the more accurate the prediction is expected to be. However, the larger working sample set 340 is, the more time the evaluation or analysis is expected to take. Thus, there is a tradeoff between accuracy and time of prediction. In one example implementation, working sample set size of 500-1000 samples was observed to work within desired constraints of accuracy and time. Each implementation will be different. In one embodiment, data filter 330 samples more heavily from the most recent data, thus weighting the prediction to the most current system operation, which can function to more accurately predict current behavior trends of the system.

Consider an example where a particular user (e.g., an application) generates a workload that uses storage system 302 up to 1000 IOPS while still meeting a latency requirement for an SLO for the workload. If the user makes a request that will increase the workload to 1500 IOPS, the storage system can determine whether increasing the workload to 1500 would result in a violation of the workload's SLO, or would cause other non-permitted results in the system. Interpolation techniques as are traditional are not effective at predicting the results of increasing to 1500 IOPS, because all past samples (i.e., observed samples, or the observed region) are for system operation with IOPS of less than 1000. In one embodiment, management server 304 extrapolates the effect of increasing to 1500 IOPS by iteratively generating synthetic or artificial samples. For example, management server 304 can generate a sample that contains the IOPS, workload signature (counters of interest), and latency at 1050 IOPS, and then proceed to 1100 IOPS, and so forth until modeling the behavior at 1500 IOPS.

Figure 4:
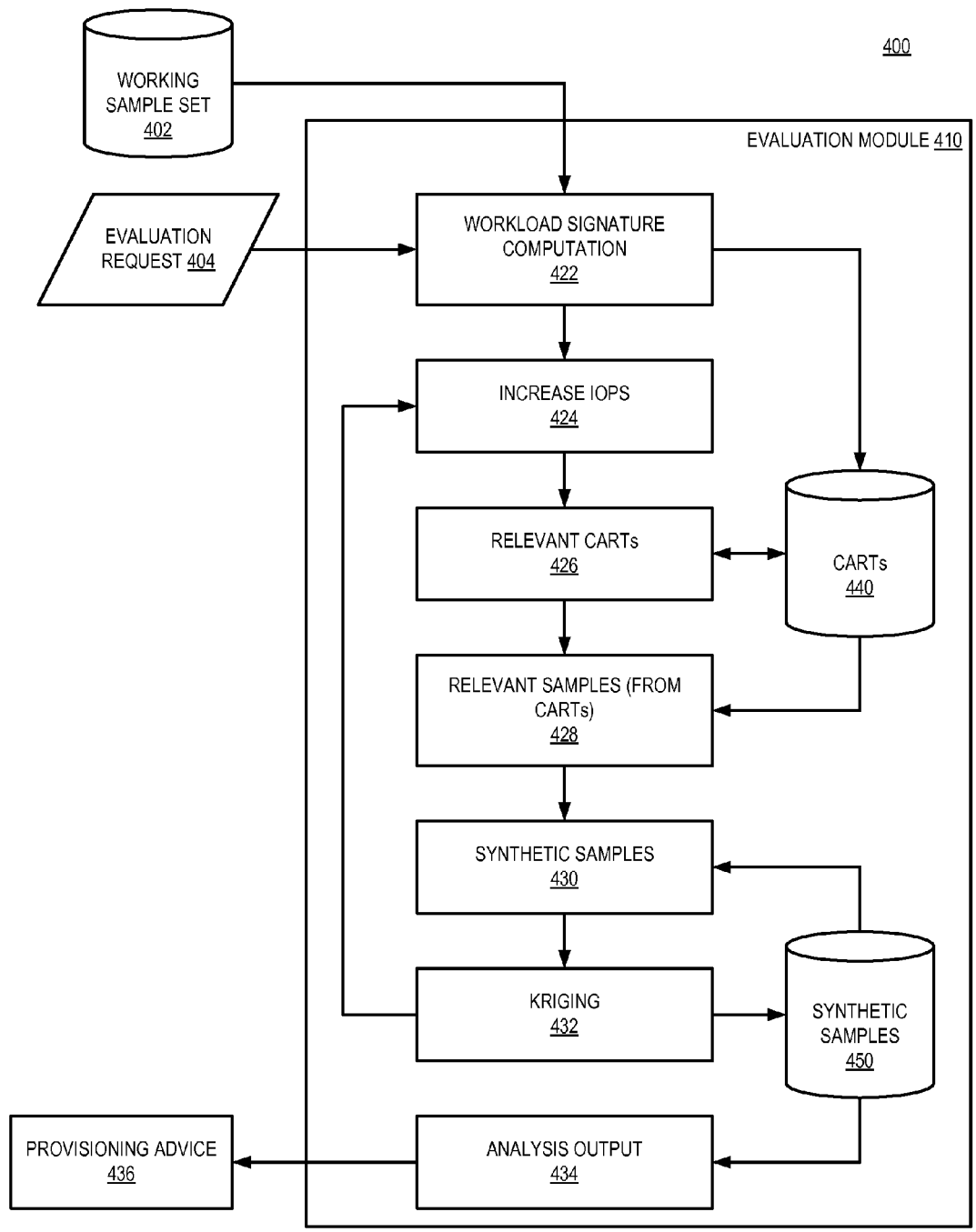
FIG. 4 is a block diagram of an embodiment of an evaluation module that extrapolates a performance change with a kriging-based analysis.

FIG. 4 is a block diagram of an embodiment of an evaluation module that extrapolates a performance change with a kriging-based analysis. System 400 represents a management server in accordance with any embodiment described herein, such as embodiments of management servers 114, 164, 210, and 304. Working sample set 402 includes observed data to be used by evaluation module 410 to predict unobserved behavior for a system. In system 400, it is assumed that evaluation module 410 is configured to evaluate a change in IOPS for a storage system. Other configurations are possible.

In one embodiment, evaluation module 410 includes workload signature computation 422, which evaluates data from working sample set 402 in response to evaluation request 404. Evaluation module 410 accesses working sample set 402 to obtain the system behavior samples to be used for making the prediction. In one embodiment, evaluation module 410 constructs a workload signature with workload signature computation 422. In one example embodiment, a workload signature can be thought of as a set of counters that determine latency against IOPS for a workload. In such a workload signature, workload signature computation 422 determines which counters should be included in the signature by computing what counters belong to a set of counters related to latency and IOPS. Thus, the workload signature should include all counters that influence the signature, and no counter that influences the signature should be outside the signature set.

Despite the illustration of workload signature computation 422 as a separate component, in one embodiment, the workload signature is actually computed through evaluation or analysis via CART. Evaluation module 410 stores the resulting calculated workload signatures, labeled as "CARTs" 440 for ease of labeling in system 400. In one embodiment, evaluation module 410 increases IOPS 424 to fulfill evaluation request 404. The increase could be a full increase to the desired IOPS, or could be incremental, as discussed above. The increase can be a fixed amount configured into evaluation module 410 or indicated by evaluation request 404.

Evaluation module 410 obtains the relevant CARTs 440, which were previously computed, for computing a prediction. In one embodiment, evaluation module 410 stores the CARTs as metadata for the sample data. Evaluation module 410 can obtain relevant CARTs 426 and extract relevant samples 428 from the obtained CARTs.

In one embodiment, the CART analysis as illustrated prunes the obtained observed data to counters that have spatial dependency with the target performance indicator, such as IOPS versus latency as illustrated in system 400. Spatial dependency can be understood mathematically as a statistical relationship between multiple random variables in a collection or set of variables. The statistical relationship is such that with spatially dependent variables, a result of a statistical computation on one of the variables can be used to predict a result of a computation on the other variable. Thus, counters are spatially dependent when an analysis of their data can be used to predict an outcome of an analysis of another counter. In particular, the dependency can be related to a target network performance.

Another way to understand the concept of the dependency is that evaluation module 410 determines a transitive closure of the counters. A transitive closure of the counters is a minimal set of counters together with the target of interest, such as IOPS and latency, which results in a set where every member of the set except the independent variable in the model (e.g., IOPS) is dependent on at least one member within the set and not dependent on any other counter outside the set.

In one embodiment, evaluation module 410 generates the samples from the stored data to reduce an amount of data used for a kriging analysis to the relevant data. It will be understood that kriging analysis is traditionally used for interpolation in geostatistics, but not for extrapolation. In one embodiment, kriging 432 of evaluation module 410 is a modified kriging analysis. The kriging analysis can be modified in that it can make a prediction based on observed data and training data. In one embodiment, synthetic samples 430 include relevant samples 428 of observed data from CARTs 440, as well as synthetic samples 450 generated based on an assumption of increased IOPS 424.

The CART analysis defines an extrapolation space or extrapolation region, and kriging 432 computes predictions in the extrapolation space, which is outside the range of observed data from working sample set 402. Synthetic samples 450 can be fed back into kriging 432 in combination with observed samples to generate a prediction in the extrapolation space. In an embodiment where the IOPS is iteratively incremented, each increase of IOPS can compute a prediction based on the previously generated samples that represent the results of kriging 432 (which are stored in synthetic samples 450). Kriging 432 not only makes a latency prediction in the extrapolation space, but also produces a confidence band along with the prediction. Whereas traditional kriging interpolates based on an assumption of linearity in a relationship between variables, evaluation module 410 can predict nonlinear behavior by first filtering data with a CART analysis prior to a kriging analysis. Thus, evaluation module 410 can provide a kriging analysis with confidence predictions for nonlinear data.

When all iterations of the analysis are completed, synthetic sample 450 stores a result of the analysis. The result is analysis output 434, which is sent to the requester. In the illustrated example of a storage system evaluation the effect of IOPS versus latency, evaluation module 410 can produce and send back provisioning advice 436 to indicate how resources should be allocated. Such provisioning advice can be whether or not to increase the IOPS as requested, or to only increase the IOPS if more resources are allocated in the system.

Assume for purposes of the following that evaluation module 410 iterates the CART and kriging analyses for increments of IOPS (as shown in system 400). As evaluation module 410 increases IOPS 424, the relevant samples 428 that can be used for predicting the extrapolated space can be extracted from CARTs 440. In one embodiment, CARTs 440 stores one CART model for each counter. For each increment in IOPS, evaluation module 410 can retrieve previously generated synthetic samples 450. Kriging 432 uses both the samples obtained from CARTs 440 and synthetic samples 450 together to train a kriging model of the system behavior.

In one embodiment, kriging 432 performs an unconstrained kriging analysis or computation for each counter separately to predict a new value for each counter for the increased IOPS. Kriging 432 can then use the new counter values to predict an expected latency value for the increased IOPS. Kriging can then store the new counter values together with the new (expected) latency value and increased IOPS value as a new synthetic sample 450. Kriging 432 can also store the confidence band for the latency prediction. Synthetic samples 450 are all considered together to generate the predicted behavior in the extrapolation space (analysis output 434).

FIG. 5 is an embodiment of pseudo-code for performing kriging-based extrapolation. As discussed above, kriging has not traditionally been used for extrapolation. Extrapolation 510 is one example of an embodiment of a kriging-based extrapolation technique. Extrapolation 510 receives as input S and Cij, where S is a signature with k samples and Ci counters. k is the number of observed samples having IOPS range from 0 to X. Extrapolation 510 predicts latency for IOPS in the range of $X+\delta X$ to $X+\Delta X$.

Extrapolation 510 illustrates an embodiment that incrementally generates outputs, which are then used as a basis for a next calculation. Thus, extrapolation generates as output latency values for a number of samples $\Delta X/\delta X$. Extrapolation 510 determines a new sample IOPS based on previous sample IOPS plus $\delta X$ using kriging with IOPS and previous sample counters as input. Extrapolation 510 extrapolates latency for the new sample using modified kriging as IOPS and signature counter values as input. Kriging receives training data from getTrainingData( ) 520, which is explained below.

More specifically referring to the pseudo-code, in line 1 the code initiates a value z that is outside the observed space (i.e., in the space beginning with k+1). In line 2 the code initializes a next sample, Ciz for every Ci that is in the input set S. In line 3 the code begins a loop for IOPS from X to $X+\Delta X$, with increments of $\delta X$.

In line 4 the code sets the current extrapolation, IOPSz equal to the previous value IOPS. In lines 5-8 the code enters a nested loop, where for every counter Ci in the set S, the code computes values for Test, Train, and Ciz. Test is a value based on IOPSz, $Cj(z-1)$ which is all previous Ci in the set S except for the current Ci, and latency. Train is a value computed by the routine getTrainingData( ) with inputs Ci and the just computed Test. Ciz is a value computed by a routine modifiedKriging( ) with Test and Train as inputs. The nested loop ends in line 9.

In line 10 the code again computes Test, but this time with the current Ci (and thus Cjz as opposed to $Cj(z-1)$), IOPSz. Latency is not a basis of Test in line 10. In line 11 the code computes Train as a function getTrainingData( ) with Latency and Test as inputs. It will be observed that in the nest loop of lines 5-9, Latency is used as an input to Test, and Ci is an input to Train, whereas in lines 10 and 11 Latency is not an input to Test, but Latency is a direct input to Train, instead of indirectly through Test being an input to Train. The nested loop generates samples (Ciz) that represent the predictions of what the counters will be in the extrapolation space. Outside the nested loop the code predicts latency and confidence for the generated counters. Thus, in line 12 the code computes latency and confidence for each latency prediction by computing modifiedKrigingConfidence( ) with the newly computed Test and Train as inputs.

Thus, it is observed that in lines 5-9 the code extrapolates counter values based on previous values, for all counters related to an independent variable Latency. In lines 10-12 the code computes latency for the current predicted counter values. Finally in line 13 the code increments z and continues the loop in line 3 for each increment of IOPS until $X+\Delta X$ is reached.

Pseudo code getTrainingData 520 is also shown at a high level. In line 1 the code constructs a Tree based on the input counters (the C input components from Test and Train). The counters in the inner loop include the previous counters, while the outer loop only includes the current counter values. The Tree is a model of the network behavior with the input counters as leaf nodes in a tree.

In line 2 the code computes values for the nodes of the Tree based on a routine findNode( ) that accepts as inputs Tree and vector. The Tree input is the model created in line 1. The vector is the Test vector, which includes values for each counter based on IOPS and Latency. Thus, findNode computes a value for each node in the tree under the evaluated conditions. In line 3 the code returns all samples corresponding to Nodes. The samples are the value generated for each node of the Tree based on the input evaluation conditions.

As described above, the measurement server measures system counters to collect data for making a prediction. The measurement server prunes the data of irrelevant counters using CART, and then uses a kriging-based analysis to extrapolate system behavior. Extrapolation 510 provides one example embodiment of how the kriging-based analysis can be performed. It will be understood that a kriging-based analysis can include execution of a "pure" kriging algorithm as is understood in the art, or a modified kriging algorithm.

As seen in extrapolation 510, training data is provided at each point that a kriging-based algorithm is implemented. A naive method of providing training data is simply to provide the entire set of available data (e.g., working sample set) to the kriging-based algorithm. However, when the number of samples is large, training can become time consuming and cannot be done in real time. Selectively choosing samples which are close to current sample values of the counter (e.g., by implementing CART as described herein) reduces the training time. The CART analysis can be performed by: 1) generating a CART tree for every counter Ci.T, where Ci∈S, where S is the set of all counters, or the signature as discussed above; and, 2) retaining: (a) the tree Ci.T∀Ci∈S; and, (b) a node sample mapping for every Ci in S (Node Sample Mapping ∀Ci∈S). Thus, the evaluation can generate a CART tree using the rest of the counters as input. The CART tree basically divides the space into small regions, with each region corresponding to a node in the CART tree. The evaluation can then divide the entire data of k samples into smaller sets for each counter.

Figure 6:
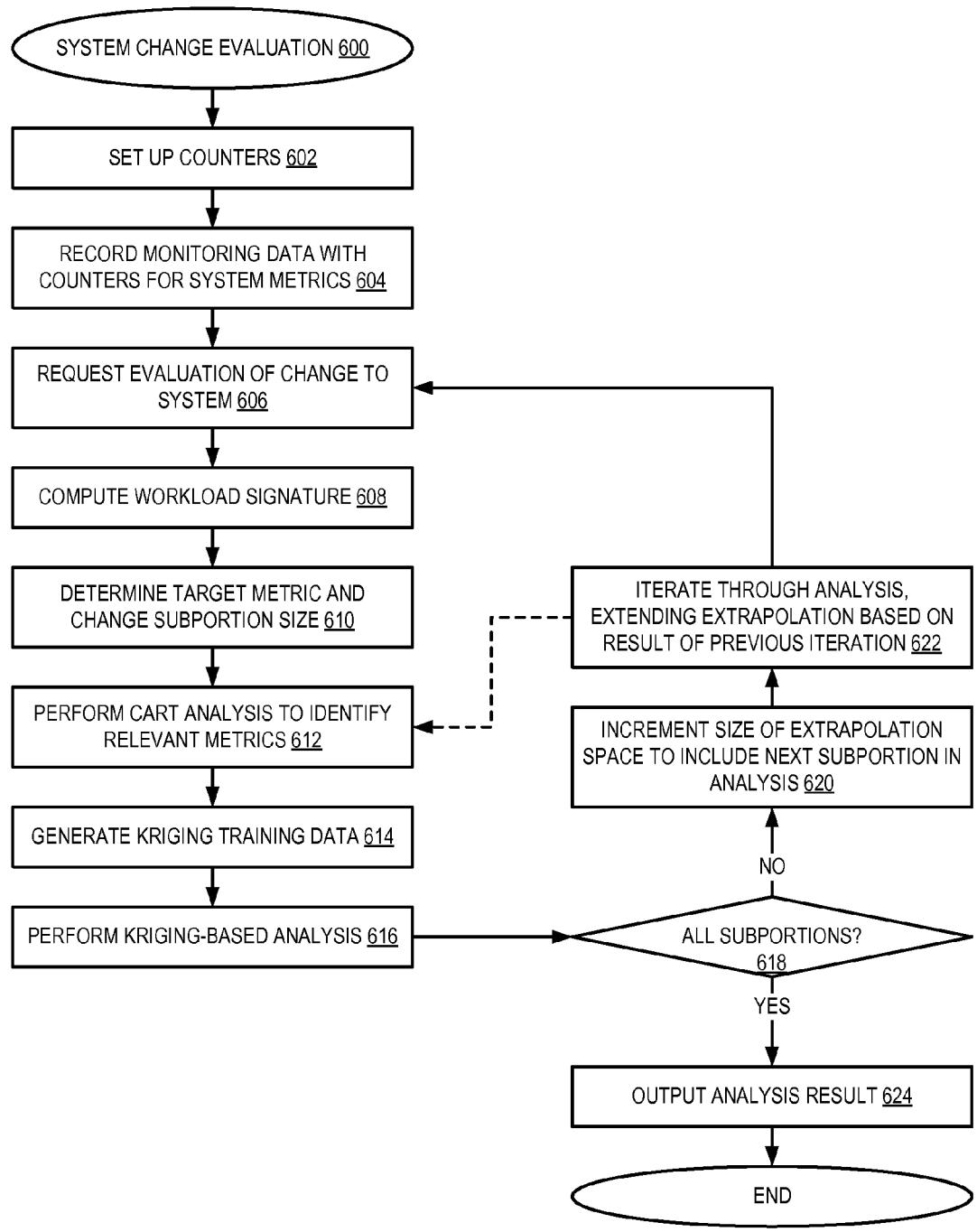
FIG. 6 is a flow diagram of an embodiment of a process for evaluating a change to a network to determine an expected impact of the change.

FIG. 6 is a flow diagram of an embodiment of a process for evaluating a change to a network to determine an expected impact of the change. In process 600, a system with a management server allows for system change evaluation. A system administrator sets up multiple counters in a networked system, block 602. The counters can monitor any of a number of metrics in the networked system. The metrics can include any measure or sampling of system performance. The counters then record monitoring data for their respective system metrics, block 604.

A management program or agent in the system requests an evaluation of a change to the system, block 606. The counters collect measurements for whatever configuration is currently present in the system, including loads in the system. A user (e.g., client application) can request an increase to its permitted load, in which case the management agent can request the evaluation of what effect that change in system configuration or change in system behavior would have on the rest of the system behavior. It will be understood that the system behavior is a sum of all performance metrics of the system. In response to the request to evaluate the change, a management server evaluates the change. Typically, the request for evaluation will be a request to evaluate an effect on a specific, target performance.

In one embodiment, the management server computes a workload signature for the load for which the change is being requested, block 608. The workload signature includes all counters in the system statistically related to the performance effect being evaluated. In one embodiment, the management server determines what the target performance metric is, and determines a change sub-portion size, block 610. As mentioned above, the target performance metric or target performance indicator can be identified by the request, or it can be configured into the evaluation module of the management server.

The management server performs a CART analysis to identify the relevant metrics or the relevant counters for making the evaluation, block 612. In one embodiment, the management server also generates kriging training data, block 614. The management server performs a kriging-based analysis on the relevant counters identified by the CART analysis, block 616. The kriging-based analysis also receives any training data generated to inform the analysis.

As mentioned above, the analysis can be separated into sub-portions of the whole change requested. The sub-portions can be portions of the evaluation space or extrapolation space to be evaluated to generate a prediction of behavior. If sub-portions are used, the management server determines whether all sub-portions of the extrapolation space have been evaluated, block 618. If not all sub-portions have been evaluated, NO branch, the management server increments the size of the extrapolation space to include the next sub-portion in the analysis, block 620. The management server then iterates through the analysis, extending the extrapolation based on the results of the previous iteration, block 622.

The analysis can then continue in one of two ways, depending on how the evaluation is configured to operate. In one embodiment, the management server generates a new or next request to an evaluation module based on the incremented extrapolation space size, and the process continues at block 606. In an alternate embodiment, the process can be considered to iterate back at block 612 by performing the CART analysis on the new extrapolation space. The difference in perspective of where the process continues can be based on looking at the management server itself (starting back at block 612) or looking at the evaluation module of the management server (starting back at block 606).

When the management server has performed the analysis on all sub-portions of the extrapolation space, YES branch of block 618, the evaluation module of the management server provides an output analysis result, block 624. The output result identifies a prediction of what will happen to system behavior for the requested change. In one embodiment, the output result includes advice of how to respond to the requested change. Evaluation process 600 is then complete.

As described herein, a system includes a management server that provides black-box modeling techniques designed for modern, dynamic and multitenant environments. Dynamic environments are those where new workloads can be dynamically added and removed during runtime of the system. Multitenant environments are those where different workload types share a common storage infrastructure because a network system isolates multiple different user organizations (tenants) from each other while sharing an underlying hardware system. The black-box model as described combines CART analysis and kriging machine learning techniques.

The combination of the techniques provides a system that can: 1) execute in "live" mode; 2) execute a prediction in an untrained (extrapolation) region; 3) predict nonlinear behavior; 4) provide modeling prediction error; and, 5) perform model correction via iterative live learning. "Live" mode or live learning refers to the ability of the evaluation system to generate models for evaluation dynamically and quickly. Quickly is a relative concept, and here refers to providing model changes on the order of minutes, versus hours of computation time required for traditional systems. Thus, the evaluation can change as the system configuration and workload changes.

Executing the prediction in an untrained region prevents the need to a priori train a model for all possible system and workload combinations. Rather, the training data can be generated on the fly for a region of unobserved behavior. The system can also predict nonlinear behavior, which is important in systems where the prediction is for an indicator that is nonlinear in nature. For example, as storage systems have evolved, increased utilization of the system increases the different combinations of varying workload types that are co-located. Thus, as the utilization of the system increases, the relationship between IOPS and latency tends to be nonlinear in nature. Only an evaluation module that allows for nonlinear prediction can make an accurate prediction model of the system.

Finally, kriging analysis can provide a prediction error to indicate an expected accuracy of the prediction. The prediction error allows higher-level management tools (e.g., provisioning and migration management tools) to choose to ignore the advice provided by the model, or to accept the advice.

The combination of CART and kriging-based analysis as described herein also provides benefits relative to other known approaches such as BASIL, Relative Fitness, or CMU CART, which are proposed for modeling storage systems. In BASIL, a system model is created via live learning by observing the impact of workload parameters. However, BASIL is specifically designed to model the system behavior in the interpolation region, and does not provide guidance with respect to modeling error. Additionally, BASIL is only effective at predicting IOPS versus latency when there is a linear relationship between IOPS and latency.

The Relative Fitness approach creates a relative model between two systems. The model captures how two systems behave for the same workload. Subsequently, when the behavior of one of the systems is known for another workload, the known behavior is combined with the previously created model to predict the behavior of the second system for that workload. However, modern data centers experience very dynamic behavior where users continuously add and remove workloads and devices. Thus, it is impractical to build the relative models needed between different device types for effective prediction.

Both in Relative Fitness and CMU CART, the model predicts performance of a storage system based on past observed samples. Thus, these approaches are limited to predictions in the interpolation region, and the predictions are only accurate to the extent the predicted sample is similar to the past observed samples.

In known machine learning techniques, support vector regression (SVR) with RBF (radial-basis function) kernels, has been used to provide prediction in the interpolation region. SVR with polynomial kernels has been used for the extrapolation, but is unable to associate a confidence level with the prediction. Without the confidence level prediction, the receiver has no way of evaluating the results for reliability.

Figure 7A:
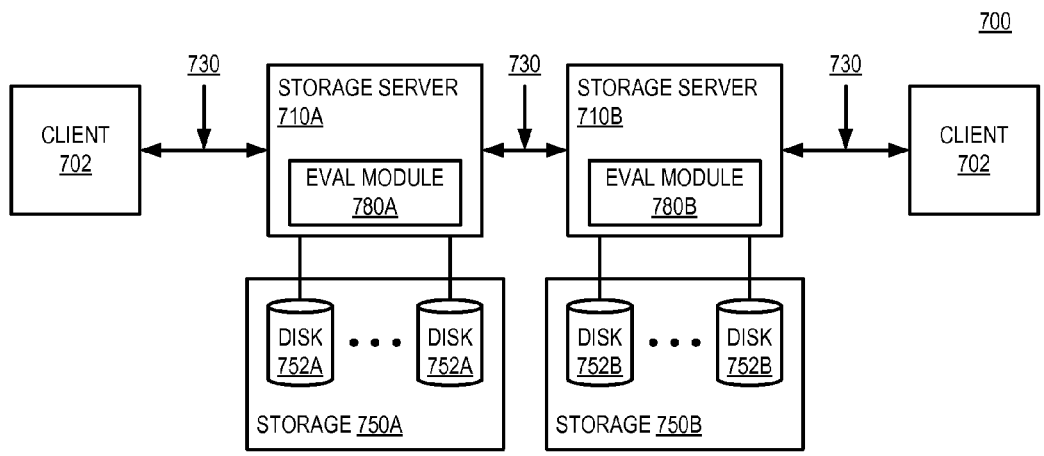
FIG. 7A illustrates a network storage system in which performance evaluation can be implemented.

FIG. 7A illustrates a network storage system in which performance evaluation can be implemented. Storage servers 710 (storage servers 710A, 710B) each manage multiple storage units 750 (storage 750A, 750B) that include mass storage devices. These storage servers provide data storage services to one or more clients 702 through a network 730. Network 730 can be, for example, a local area network (LAN), wide area network (WAN), metropolitan area network (MAN), global area network such as the Internet, a Fibre Channel fabric, or any combination of such interconnects. Each of clients 702 can be, for example, a conventional personal computer (PC), server-class computer, workstation, handheld computing or communication device, or other special or general purpose computer.

Storage of data in storage units 750 is managed by storage servers 710 which receive and respond to various read and write requests from clients 702, directed to data stored in or to be stored in storage units 750. Storage units 750 constitute mass storage devices which can include, for example, flash memory, magnetic or optical disks, or tape drives, illustrated as disks 752 (752A, 752B). Storage devices 752 can further be organized into arrays (not illustrated) implementing a Redundant Array of Inexpensive Disks/Devices (RAID) scheme, whereby storage servers 710 access storage units 750 using one or more RAID protocols known in the art.

Storage servers 710 can provide file-level service such as used in a network-attached storage (NAS) environment, block-level service such as used in a storage area network (SAN) environment, a service which is capable of providing both file-level and block-level service, or any other service capable of providing other data access services. Although storage servers 710 are each illustrated as single units in FIG. 7A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module), and the N-module can include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 7B and embodiments of a D-module and an N-module are described further below with respect to FIG. 9.

In one embodiment, storage servers 710 are referred to as network storage subsystems. A network storage subsystem provides networked storage services for a specific application or purpose, and can be implemented with a collection of networked resources provided across multiple storage servers and/or storage units.

In the embodiment of FIG. 7A, one of the storage servers (e.g., storage server 710A) functions as a primary provider of data storage services to client 702. Data storage requests from client 702 are serviced using disks 752A organized as one or more storage objects. A secondary storage server (e.g., storage server 710B) takes a standby role in a mirror relationship with the primary storage server, replicating storage objects from the primary storage server to storage objects organized on disks of the secondary storage server (e.g., disks 750B). In operation, the secondary storage server does not service requests from client 702 until data in the primary storage object becomes inaccessible such as in a disaster with the primary storage server, such event considered a failure at the primary storage server. Upon a failure at the primary storage server, requests from client 702 intended for the primary storage object are serviced using replicated data (i.e. the secondary storage object) at the secondary storage server.

It will be appreciated that in other embodiments, network storage system 700 can include more than two storage servers. In these cases, protection relationships can be operative between various storage servers in system 700 such that one or more primary storage objects from storage server 710A can be replicated to a storage server other than storage server 710B (not shown in this figure). Secondary storage objects can further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 710 should be taken as illustrative only.

In one embodiment, system 700 includes evaluation modules 780 (780A, 780B) server-side. Evaluation modules 780 include logic that allows system 700 to perform an analysis of the system in light of a predicted change in the system. In one embodiment, evaluation modules 780 are implemented on separate physical machine from storage servers 710. Evaluation modules 780 interpolate system behavior in light of a system change based on a CART analysis and a kriging-based model analysis.

Figure 7B:
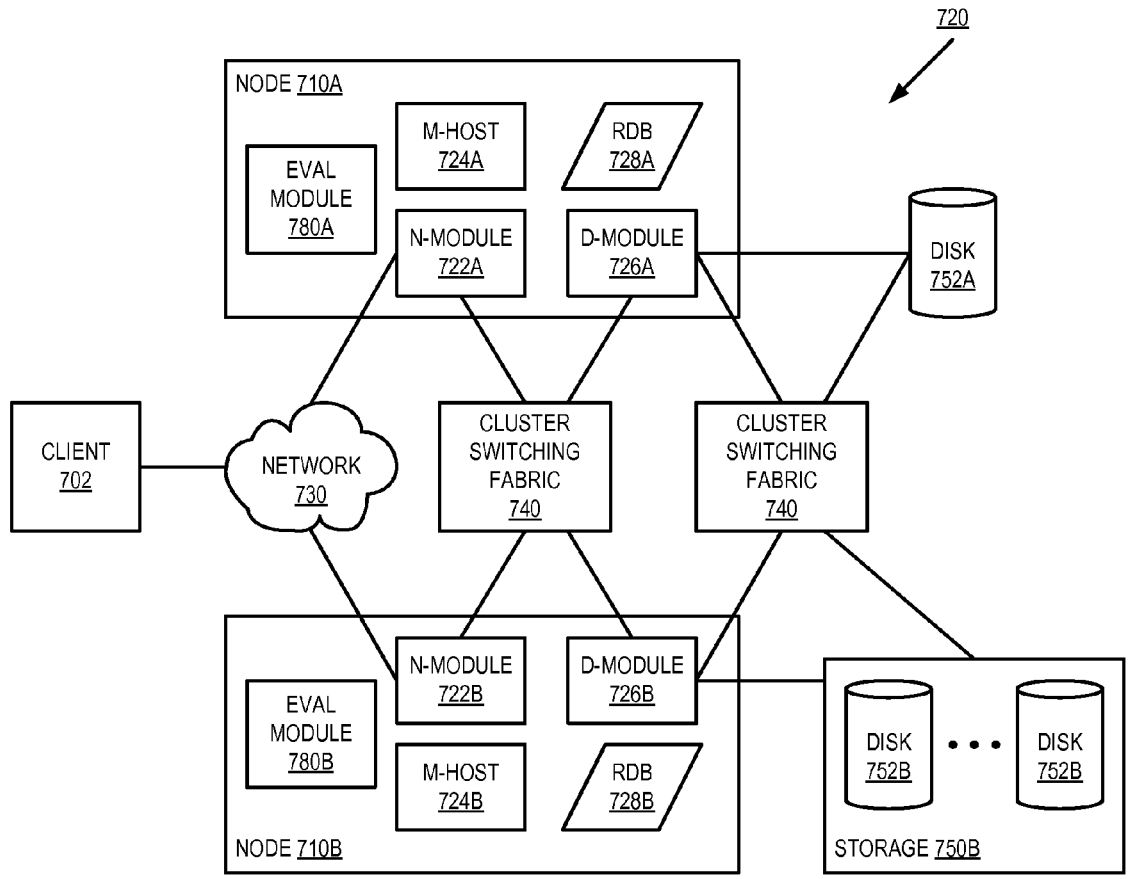
FIG. 7B illustrates a distributed or clustered architecture for a network storage system in which performance evaluation can be implemented in an alternative embodiment.

FIG. 7B illustrates a distributed or clustered architecture for a network storage system in which performance evaluation can be implemented in an alternative embodiment. System 720 can include storage servers implemented as nodes 710 (nodes 710A, 710B) which are each configured to provide access to storage devices 752. In FIG. 7B, nodes 710 are interconnected by a cluster switching fabric 740, which can be embodied as an Ethernet switch.

Nodes 710 can be operative as multiple functional components that cooperate to provide a distributed architecture of system 720. To that end, each node 710 can be organized as a network element or module (N-module 722A, 722B), a disk element or module (D-module 726A, 726B), and a management element or module (M-host 724A, 724B). In one embodiment, each module includes a processor and memory for carrying out respective module operations. For example, N-module 722 can include functionality that enables node 710 to connect to client 702 via network 730 and can include protocol components such as a media access layer, Internet Protocol (IP) layer, Transport Control Protocol (TCP) layer, User Datagram Protocol (UDP) layer, and other protocols known in the art.

In contrast, D-module 726 can connect to one or more storage devices 752 via cluster switching fabric 740 and can be operative to service access requests on devices 750. In one embodiment, the D-module 726 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 7B, a storage abstraction layer (e.g., file system) of the D-module divides the physical storage of devices 750 into storage objects. Requests received by node 710 (e.g., via N-module 722) can thus include storage object identifiers to indicate a storage object on which to carry out the request.

Also operative in node 710 is M-host 724 which provides cluster services for node 710 by performing operations in support of a distributed storage system image, for instance, across system 720. M-host 724 provides cluster services by managing a data structure such as a relational database (RDB) 728 (RDB 728A, RDB 728B) which contains information used by N-module 722 to determine which D-module 726 "owns" (services) each storage object. The various instances of RDB 728 across respective nodes 710 can be updated regularly by M-host 724 using conventional protocols operative between each of the M-hosts (e.g., across network 730) to bring them into synchronization with each other. A client request received by N-module 722 can then be routed to the appropriate D-module 726 for servicing to provide a distributed storage system image.

As described above, evaluation modules 780 include logic that allows system 700 to perform an analysis of the system in light of a predicted change in the system. In one embodiment, evaluation modules 780 are implemented at certain nodes, but not all nodes of system 720. Where evaluation modules 780 are implemented, they interpolate system behavior in light of a system change based on a CART analysis and a kriging-based model analysis.

It will be noted that while FIG. 7B shows an equal number of N- and D-modules constituting a node in the illustrative system, there can be different number of N- and D-modules constituting a node in accordance with various embodiments. For example, there can be a number of N-modules and D-modules of node 710A that does not reflect a one-to-one correspondence between the N- and D-modules of node 710B. As such, the description of a node comprising one N-module and one D-module for each node should be taken as illustrative only.

Figure 8:
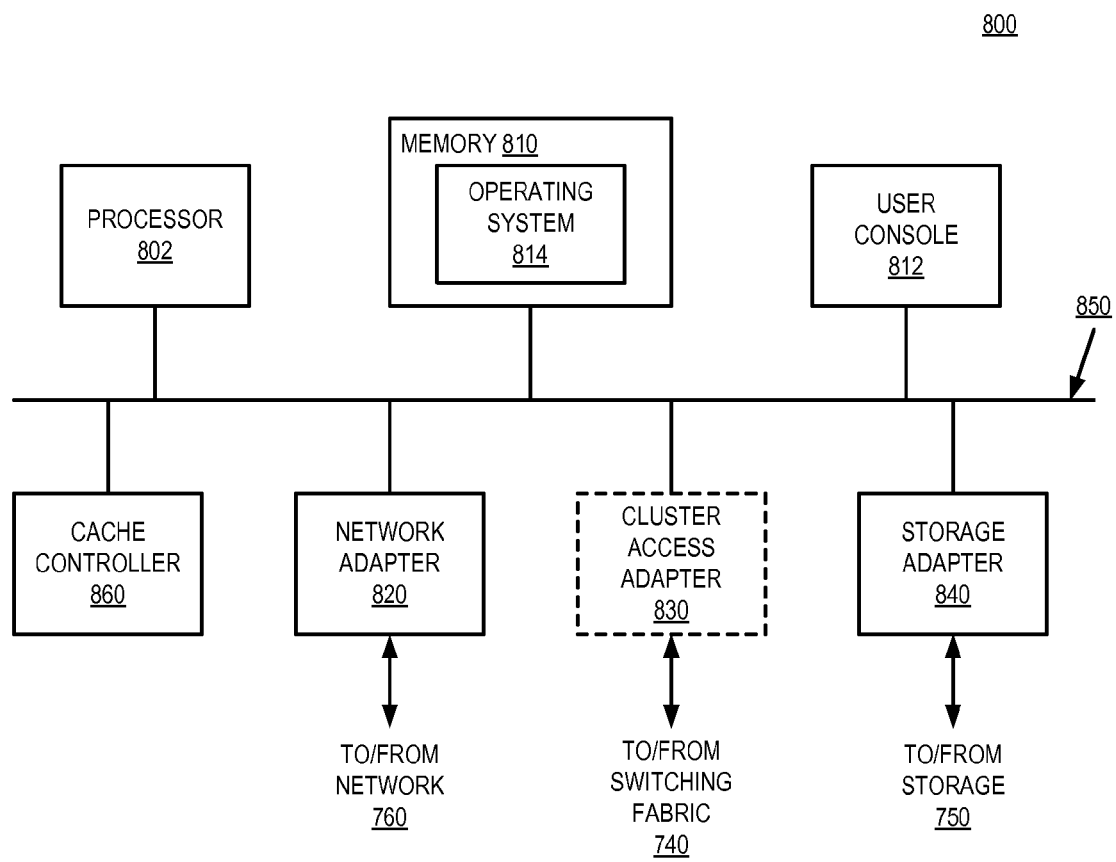
FIG. 8 is a block diagram of an illustrative embodiment of an environment of FIGS. 7A and 7B in which performance evaluation can be implemented.

FIG. 8 is a block diagram of an embodiment of a storage server, such as storage servers 710A and 710B of FIGS. 7A and 7B in which performance evaluation can be implemented.

As illustrated, the storage server is embodied as a general or special purpose computer 800 including a processor 802, a memory 810, a network adapter 820, a user console 812 and a storage adapter 840 interconnected by a system bus 850, such as a convention Peripheral Component Interconnect (PCI) bus.

Memory 810 includes storage locations addressable by processor 802, network adapter 820 and storage adapter 840 for storing processor-executable instructions and data structures associated with a multi-tiered cache with a virtual storage appliance. A storage operating system 814, portions of which are typically resident in memory 810 and executed by processor 802, functionally organizes the storage server by invoking operations in support of the storage services provided by the storage server. It will be apparent to those skilled in the art that other processing means can be used for executing instructions and other memory means, including various computer readable media, can be used for storing program instructions pertaining to the inventive techniques described herein. It will also be apparent that some or all of the functionality of the processor 802 and executable software can be implemented by hardware, such as integrated currents configured as programmable logic arrays, ASICs, and the like.

Network adapter 820 comprises one or more ports to couple the storage server to one or more clients over point-to-point links or a network. Thus, network adapter 820 includes the mechanical, electrical and signaling circuitry needed to couple the storage server to one or more client over a network. Each client can communicate with the storage server over the network by exchanging discrete frames or packets of data according to pre-defined protocols, such as TCP/IP.

Storage adapter 840 includes a plurality of ports having input/output (I/O) interface circuitry to couple the storage devices (e.g., disks) to bus 850 over an I/O interconnect arrangement, such as a conventional high-performance, FC or SAS (Serial-Attached SCSI (Small Computer System Interface)) link topology. Storage adapter 840 typically includes a device controller (not illustrated) comprising a processor and a memory for controlling the overall operation of the storage units in accordance with read and write commands received from storage operating system 814. As used herein, data written by a device controller in response to a write command is referred to as "write data," whereas data read by device controller responsive to a read command is referred to as "read data."

User console 812 enables an administrator to interface with the storage server to invoke operations and provide inputs to the storage server using a command line interface (CLI) or a graphical user interface (GUI). In one embodiment, user console 812 is implemented using a monitor and keyboard.

In one embodiment, computing device 800 includes cache controller 860. While shown as a separate component, in one embodiment, cache controller 860 is part of other components of computer 800. Cache controller 860 is a cache controller that enables selective caching based on sequentiality of data associated with data access requests. The cache controller identifies address range information and bypass caching for data whose range is greater than a threshold.

When implemented as a node of a cluster, such as cluster 720 of FIG. 7B, the storage server further includes a cluster access adapter 830 (shown in phantom) having one or more ports to couple the node to other nodes in a cluster. In one embodiment, Ethernet is used as the clustering protocol and interconnect media, although it will be apparent to one of skill in the art that other types of protocols and interconnects can by utilized within the cluster architecture.

Figure 9:
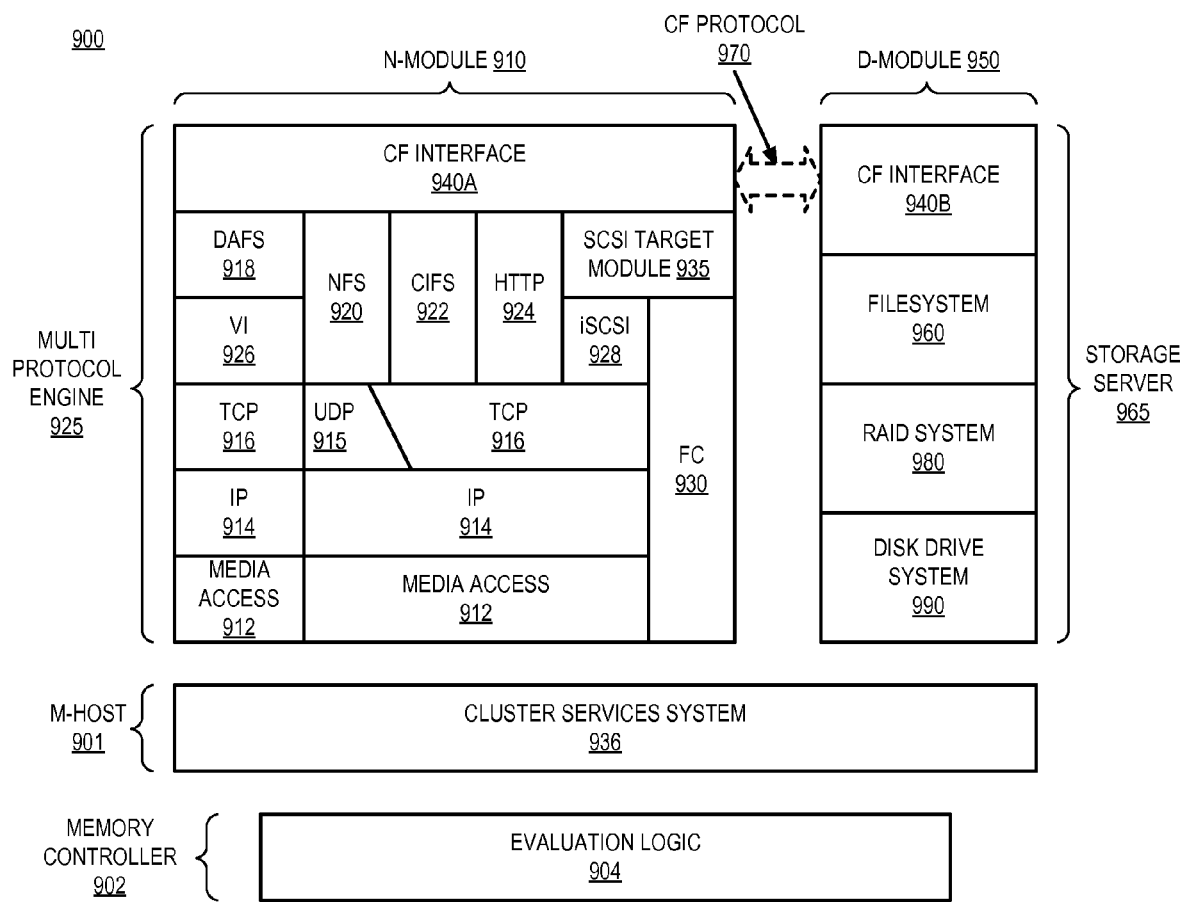
FIG. 9 illustrates an embodiment of the storage operating system of FIG. 8 in which performance evaluation can be implemented.

FIG. 9 is a block diagram of a storage operating system 900, such as storage operating system 814 of FIG. 8, in which performance evaluation can be implemented. The storage operating system comprises a series of software layers executed by a processor, such as processor 802 of FIG. 8, and organized to form an integrated network protocol stack or, more generally, a multi-protocol engine 925 that provides data paths for clients to access information stored on the storage server using block and file access protocols.

Multi-protocol engine 925 includes a media access layer 912 of network drivers (e.g., gigabit Ethernet drivers) that interface with network protocol layers, such as the IP layer 914 and its supporting transport mechanisms, the TCP layer 916 and the User Datagram Protocol (UDP) layer 915. The different instances of access layer 912, IP layer 914, and TCP layer 916 are associated with two different protocol paths or stacks. A file system protocol layer provides multi-protocol file access and, to that end, includes support for the Direct Access File System (DAFS) protocol 918, the NFS protocol 920, the CIFS protocol 922 and the Hypertext Transfer Protocol (HTTP) protocol 924. A VI (virtual interface) layer 926 implements the VI architecture to provide direct access transport (DAT) capabilities, such as RDMA, as required by the DAFS protocol 918. An iSCSI driver layer 928 provides block protocol access over the TCP/IP network protocol layers, while a FC driver layer 930 receives and transmits block access requests and responses to and from the storage server. In certain cases, a Fibre Channel over Ethernet (FCoE) layer (not shown) can also be operative in multi-protocol engine 925 to receive and transmit requests and responses to and from the storage server. The FC and iSCSI drivers provide respective FC- and iSCSI-specific access control to the blocks and, thus, manage exports of luns (logical unit numbers) to either iSCSI or FCP or, alternatively, to both iSCSI and FCP when accessing blocks on the storage server.

The storage operating system also includes a series of software layers organized to form a storage server 965 that provides data paths for accessing information stored on storage devices. Information can include data received from a client, in addition to data accessed by the storage operating system in support of storage server operations such as program application data or other system data. Preferably, client data can be organized as one or more logical storage objects (e.g., volumes) that comprise a collection of storage devices cooperating to define an overall logical arrangement. In one embodiment, the logical arrangement can involve logical volume block number (vbn) spaces, wherein each volume is associated with a unique vbn.

File system 960 implements a virtualization system of the storage operating system through the interaction with one or more virtualization modules (illustrated as a SCSI target module 935). SCSI target module 935 is generally disposed between drivers 928, 930 and file system 960 to provide a translation layer between the block (lun) space and the file system space, where luns are represented as blocks. In one embodiment, file system 960 implements a WAFL (write anywhere file layout) file system having an on-disk format representation that is block-based using, e.g., 4 kilobyte (KB) blocks and using a data structure such as index nodes or indirection nodes ("inodes") to identify files and file attributes (such as creation time, access permissions, size and block location). File system 960 uses files to store metadata describing the layout of its file system, including an inode file, which directly or indirectly references (points to) the underlying data blocks of a file.

Operationally, a request from a client is forwarded as a packet over the network and onto the storage server where it is received at a network adapter. A network driver such as layer 912 or layer 930 processes the packet and, if appropriate, passes it on to a network protocol and file access layer for additional processing prior to forwarding to file system 960. There, file system 960 generates operations to load (retrieve) the requested data from the disks if it is not resident "in core", i.e., in memory 810. If the information is not in memory, file system 960 accesses the inode file to retrieve a logical vbn and passes a message structure including the logical vbn to the RAID system 980. There, the logical vbn is mapped to a disk identifier and device block number (disk, dbn) and sent to an appropriate driver of disk driver system 990. The disk driver accesses the dbn from the specified disk and loads the requested data block(s) in memory for processing by the storage server. Upon completion of the request, the node (and operating system 900) returns a reply to the client over the network.

It should be noted that the software "path" through the storage operating system layers described above needed to perform data storage access for the client request received at the storage server adaptable to the teachings of the invention can alternatively be implemented in hardware. That is, in an alternate embodiment of the invention, a storage access request data path can be implemented as logic circuitry embodied within a field programmable gate array (FPGA) or an application specific integrated circuit (ASIC). This type of hardware embodiment increases the performance of the storage service provided by the storage server in response to a request issued by a client. Moreover, in another alternate embodiment of the invention, the processing elements of adapters 820, 840 can be configured to offload some or all of the packet processing and storage access operations, respectively, from processor 802, to increase the performance of the storage service provided by the storage server. It is expressly contemplated that the various processes, architectures and procedures described herein can be implemented in hardware, firmware or software.

When implemented in a cluster, data access components of the storage operating system can be embodied as D-module 950 for accessing data stored on disk. In contrast, multi-protocol engine 925 can be embodied as N-module 910 to perform protocol termination with respect to a client issuing incoming access over the network, as well as to redirect the access requests to any other N-module in the cluster. A cluster services system 936 can further implement an M-host (e.g., M-host 901) to provide cluster services for generating information sharing operations to present a distributed file system image for the cluster. For instance, media access layer 912 can send and receive information packets between the various cluster services systems of the nodes to synchronize the replicated databases in each of the nodes.

In addition, a cluster fabric (CF) interface module 940 (CF interface modules 940A, 940B) can facilitate intra-cluster communication between N-module 910 and D-module 950 using a CF protocol 970. For instance, D-module 950 can expose a CF application programming interface (API) to which N-module 910 (or another D-module not shown) issues calls. To that end, CF interface module 940 can be organized as a CF encoder/decoder using local procedure calls (LPCs) and remote procedure calls (RPCs) to communicate a file system command between D-modules residing on the same node and remote nodes, respectively.

In one embodiment, cache controller 902 operates in parallel to storage operating system 900. In one embodiment, cache controller is executed as a process below OS 900. Cache controller 902 is a cache controller that enables selective caching based on sequentiality of data associated with data access requests, in accordance with any embodiment described herein. The cache controller identifies address range information and bypass caching for data whose range is greater than a threshold.

In one embodiment, evaluation logic 904 implements an evaluation module for operating system 900. In one embodiment, evaluation logic 904 can be implemented in D-module 950. In an alternate embodiment, evaluation logic 904 implements an evaluation module separate from other modules of operating system 900. Evaluation logic 904 includes logic to perform an analysis of the system in light of a predicted change in the system, including interpolating system behavior in light of a system change based on a CART analysis and a kriging-based model analysis.

As used herein, the term "storage operating system" generally refers to the computer-executable code operable on a computer to perform a storage function that manages data access and can implement data access semantics of a general purpose operating system. The storage operating system can also be implemented as a microkernel, an application program operating over a general-purpose operating system, or as a general-purpose operating system with configurable functionality, which is configured for storage applications as described herein.

Flow diagrams as illustrated herein provide examples of sequences of various process actions. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various operations or functions are described herein, which can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communications interface to send data via the communications interface. A machine readable medium or computer readable medium can cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations without departing from their scope. Therefore, the illustrations and examples herein should be construed in an illustrative, and not a restrictive sense.

What is claimed is:

1. A method for analyzing a change in a network, comprising:
   accessing multiple counters of a network system to obtain observed data, each counter of the multiple counters recording samples for a metric in the network;
   performing a classification and regression tree (CART) analysis of the obtained observed data to select a subset of the multiple counters whose metrics are related to a target network performance;
   extrapolating with a kriging-based analysis of the subset of the multiple counters selected from the CART analysis, wherein said extrapolating yields data for the selected subset of the multiple counters beyond the observed data; and
   indicating whether a criterion of a to-be-provisioned workload will be satisfied based, at least in part, on the data yielded from said extrapolating and whether a criterion of an already provisioned workload will be violated based, at least in part on the data yielded from the extrapolating.

2. The method of claim 1, wherein the target network performance corresponds to the to-be-provisioned workload, and a service level objective of the to-be-provisioned workload comprises the criterion of the to-be-provisioned workload.

3. The method of claim 1, wherein accessing the multiple counters recording samples for metrics comprises:
   accessing multiple counters recording samples indicating system specific metrics and workload specific metrics.

4. The method of claim 1, wherein accessing multiple counters recording samples for metrics comprises:
   accessing multiple counters recording samples of one or more of IOPS (input/output per second), read/write ratio, random/sequential ratio, or I/O (input/output) size.

5. The method of claim 1, wherein performing the CART analysis of the obtained observed data to select the subset of multiple counters comprises:
   using the CART analysis to prune the multiple counters that do not have spatial dependency with the target network performance.

6. The method of claim 1, wherein said extrapolating with the kriging-based analysis of the selected subset of the multiple counters comprises:
   providing, for the kriging-based analysis, inputs including the obtained observed data for the selected subset of the multiple counters, and training data for the selected subset of the multiple counters, wherein the training data includes synthetic, non-observed sample data.

7. The method of claim 1, wherein said extrapolating with the kriging-based analysis of the selected subset of the multiple counters comprises incrementally extrapolating from the obtained observed data of the selected subset of the multiple counters to a target performance indicator.

8. The method of claim 1, further comprising:
   providing an error prediction with prediction results for the target network performance to a requester, the error prediction indicating a confidence level associated with the results.

9. A server device comprising:
a network interface device to access multiple counters of a network system to obtain observed data, each counter of the multiple counters to record samples for a metric in the network; and
processing hardware to execute an evaluation module to perform a classification and regression tree (CART) analysis of the obtained observed data to select a subset of the multiple counters whose metrics are related to a target network performance, to extrapolate beyond the observed data with a kriging-based analysis of the subset of the multiple counters selected with the CART analysis, and to indicate whether a criterion of a to-be-provisioned workload will be satisfied based, at least in part, on the extrapolation beyond the observed data and whether a criterion of an already provisioned workload will be violated based, at least in part on extrapolation.

10. The server device of claim 9, wherein the target network performance corresponds to the to-be-provisioned workload, and a service level objective of the to-be-provisioned workload comprises the criterion of the to-be-provisioned workload.

11. The server device of claim 9, wherein the network interface device to access the multiple counters to obtain samples indicating system specific metrics and workload specific metrics.

12. The server device of claim 9, wherein the network interface device to access the multiple counters to obtain samples of one or more of IOPS (input/output per second), read/write ratio, random/sequential ratio, or I/O (input/output) size.

13. The server device of claim 9, wherein the evaluation module to perform the CART analysis to prune the multiple counters that do not have spatial dependency with the target network performance.

14. The server device of claim 9, wherein the evaluation module to extrapolate beyond the observed data with the kriging-based analysis comprises the evaluation module to provide inputs to the kriging-based analysis, the inputs including the obtained observed data for the selected subset of the multiple counters, and training data for the selected subset of the multiple counters, wherein the training data includes synthetic, non-observed sample data.

15. The server device of claim 9, wherein the evaluation module to extrapolate with the kriging-based analysis of the selected subset of the multiple counters comprises the evaluation module to incrementally extrapolate from the obtained observed data of the selected subset of the multiple counters to a target performance indicator.

16. The server device of claim 9, wherein the evaluation module is to provide an error prediction with prediction results for the target network performance to a requester, the error prediction indicating a confidence level associated with the results.

17. An article of manufacture comprising a non-transitory computer-readable medium having program instructions stored thereon, the program instructions to:
access multiple counters of a network system to obtain observed data, each counter of the multiple to record samples for a metric in the network;
perform a classification and regression tree (CART) analysis of the obtained observed data to select a subset of the multiple counters whose metrics are related to a target network performance;
extrapolate beyond the observed data with a kriging-based analysis of the subset of the multiple counters selected with the CART analysis; and
indicate whether a criterion of a to-be-provisioned workload will be satisfied based, at least in part, on the data yielded from said extrapolating and whether a criterion of an already provisioned workload will be violated based, at least in part on the data yielded from the extrapolating.

18. The article of manufacture of claim 17, wherein the target network performance corresponds to the to-be-provisioned workload, and a service level objective of the to-be-provisioned workload comprises the criterion of the to-be-provisioned workload.

19. The article of manufacture of claim 17, wherein the program instructions to access the multiple counters to record samples for metrics comprises program instructions to access the multiple counters to record samples indicating system specific metrics and workload specific metrics.

20. The article of manufacture of claim 17, wherein the program instructions to access the multiple counters to record samples for metrics comprises program instructions to access the multiple counters to record samples of one or more of IOPS (input/output per second), read/write ratio, random/sequential ratio, or I/O (input/output) size.

21. The article of manufacture of claim 17, wherein the program instructions to perform the CART analysis of the obtained observed data to select the subset of the multiple counters comprises program instructions to use the CART analysis to prune the multiple counters that do not have spatial dependency with the target network performance.

22. The article of manufacture of claim 17, wherein the program instructions to extrapolate beyond the observed data with the kriging-based analysis comprises program instructions to provide inputs to the kriging-based analysis, the inputs including the obtained observed data for the selected subset of the multiple counters, and training data for the selected subset of the multiple counters, wherein the training data includes synthetic, non-observed sample data.

23. The article of manufacture of claim 17, wherein the program instructions to extrapolate with the kriging-based analysis of the selected subset of the multiple counters comprises program instructions to incrementally extrapolate from the obtained observed data of the selected subset of the multiple counters to a target performance indicator.

24. The article of manufacture of claim 17, further comprising program instructions to provide an error prediction with prediction results for the target network performance to a requester, the error prediction indicating a confidence level associated with the results.

* * * * *